US006578282B2

(12) United States Patent
Haegele et al.

(10) Patent No.: US 6,578,282 B2
(45) Date of Patent: Jun. 17, 2003

(54) DISPOSABLE CYLINDER HEAD BOLT TORQUE SEQUENCE TEMPLATE

(75) Inventors: Glen T. Haegele, Columbus, IN (US); James N. Humphrey, Columbus, IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 09/793,181

(22) Filed: Feb. 26, 2001

(65) Prior Publication Data

US 2002/0157272 A1 Oct. 31, 2002

(51) Int. Cl.[7] ........................ G01B 3/00

(52) U.S. Cl. ........................ 33/563; 33/600; 33/113; 277/598; 277/321

(58) Field of Search ........................ 33/562, 563, 1 B, 33/1 G, 1 BB, 600, 566; 206/459.1, 459.5, 223, 232; 283/81; 277/598, 321, 592; 40/299.1, 360

(56) References Cited

U.S. PATENT DOCUMENTS

| | | | | | |
|---|---|---|---|---|---|
| 1,818,019 | A | * | 8/1931 | Sutcliffe | 40/657 |
| 2,018,106 | A | * | 10/1935 | Zahodiakin | 73/120 |
| 2,580,060 | A | * | 12/1951 | Zimmerman | 206/53 |
| 2,827,710 | A | * | 3/1958 | Campbell | 33/600 |
| 3,214,010 | A | * | 10/1965 | Sunshine | 206/303 |
| 3,623,602 | A | * | 11/1971 | Valente | 206/459.1 |
| 3,795,983 | A | * | 3/1974 | Gallagher et al. | 33/666 |
| 4,063,640 | A | * | 12/1977 | Wilkinson | 206/231 |
| 4,177,569 | A | | 12/1979 | Greer | 33/562 |
| 4,199,060 | A | * | 4/1980 | Howard | 206/231 |
| 4,294,354 | A | * | 10/1981 | Ariga | 206/335 |
| 4,531,633 | A | * | 7/1985 | Evans | 206/230 |
| 4,538,819 | A | * | 9/1985 | Wagner et al. | 277/606 |
| 4,813,691 | A | * | 3/1989 | Schoenborn | 277/598 |
| 5,107,601 | A | | 4/1992 | Semchuck | 33/759 |
| 5,232,228 | A | * | 8/1993 | Miyaoh | 277/313 |
| 5,415,418 | A | | 5/1995 | Stimpson | 277/598 |
| 5,524,758 | A | * | 6/1996 | Lupul | 206/459.5 |
| 5,685,547 | A | * | 11/1997 | Jargeaix | 277/598 |
| 6,155,413 | A | * | 12/2000 | Bilanchone | 206/229 |
| 6,409,178 | B1 | * | 6/2002 | Raden et al. | 277/592 |

* cited by examiner

*Primary Examiner*—Diego Gutierrez
*Assistant Examiner*—R. Alexander Smith
(74) *Attorney, Agent, or Firm*—Woodard, Emhardt, Moriarty, McNett & Henry LLP

(57) ABSTRACT

A torque sequence template includes a head gasket backing that is constructed and arranged to support a head gasket when packaged with the backing. The head gasket backing has a plurality of tightening sequence punch-outs arranged thereon in positions corresponding to head bolt locations. The cylinder head bolts are used to secure an engine head to the block. The head gasket backing has sequence indicators provided next to the punch-outs that indicate the sequence in which the bolts are to be tightened.

17 Claims, 4 Drawing Sheets

DISPOSABLE CYLINDER HEAD BOLT TORQUE SEQUENCE TEMPLATE

BACKGROUND OF THE INVENTION

The present invention generally relates to bolt torque sequence templates, and more specifically, but not exclusively, concerns a disposable head bolt torque sequence template.

In order to properly rebuild an internal combustion engine, cylinder head bolts of the engine must be tightened in the proper sequence. Tightening of the head bolts in the proper sequence ensures proper compression of the head gasket between the engine block and the cylinder head of the engine. Improper tightening of the head bolts can warp the cylinder head. Typically, a mechanic consults a shop manual and follows a torque sequence listed in the shop manual for the particular engine. However, since each engine family generally has a unique torque sequence, there is a risk that the wrong sequence will be mistakenly used. The print in the service manual is also rather small and can be easily misread. Further, errors may occur because the service manual may not be kept up to date.

One solution to this problem has been to purchase a non-disposable, plastic template for each engine type. Storage of these templates can be problematic, and the templates can be easily lost. After being used a number of times, the template can become dirty, which can make reading of the template difficult. Future engine designs are leaning towards using even more head bolts per engine, and for each new design, a different template has to be ordered. If not ordered, the templates may not be available when needed.

In another solution to this problem, torque sequence numbers are imprinted or embossed on a valve cover gasket at positions near the bolts. For embossing, the tooling needs to be specially designed in order to form the torque sequence numbers on the valve cover gasket. Both embossing and imprinting the torque sequence numbers increases the risk of damaging the valve cover gasket and increases the cost of the valve cover gasket. Furthermore, using the valve cover gasket as a template requires that the valve cover gasket be installed prior to tightening of the bolts. This can increase the risk of damaging of the valve cover gasket. Therefore, there has been a long felt need for a head bolt torque sequence template that is readily available and easy to use.

SUMMARY OF THE INVENTION

One form of the present invention concerns a torque sequence template. The template includes a head gasket backing constructed and arranged to support a head gasket when packaged with the head gasket. The backing has at least two bolt openings defined therein at positions corresponding to positions of bolts that compress the head gasket between a cylinder head and an engine block. The backing has a torque sequence indicator provided next to each of the bolt openings for indicating a torque sequence for the bolts.

Another form concerns a package that includes a head gasket and a head gasket backing. The backing supports the head gasket. The backing has at least two torque sequence indicators arranged thereon to indicate a torque sequence of bolts that compress the head gasket between a cylinder head and an engine block.

DESCRIPTION OF SELECTED EMBODIMENTS

Figure 1:
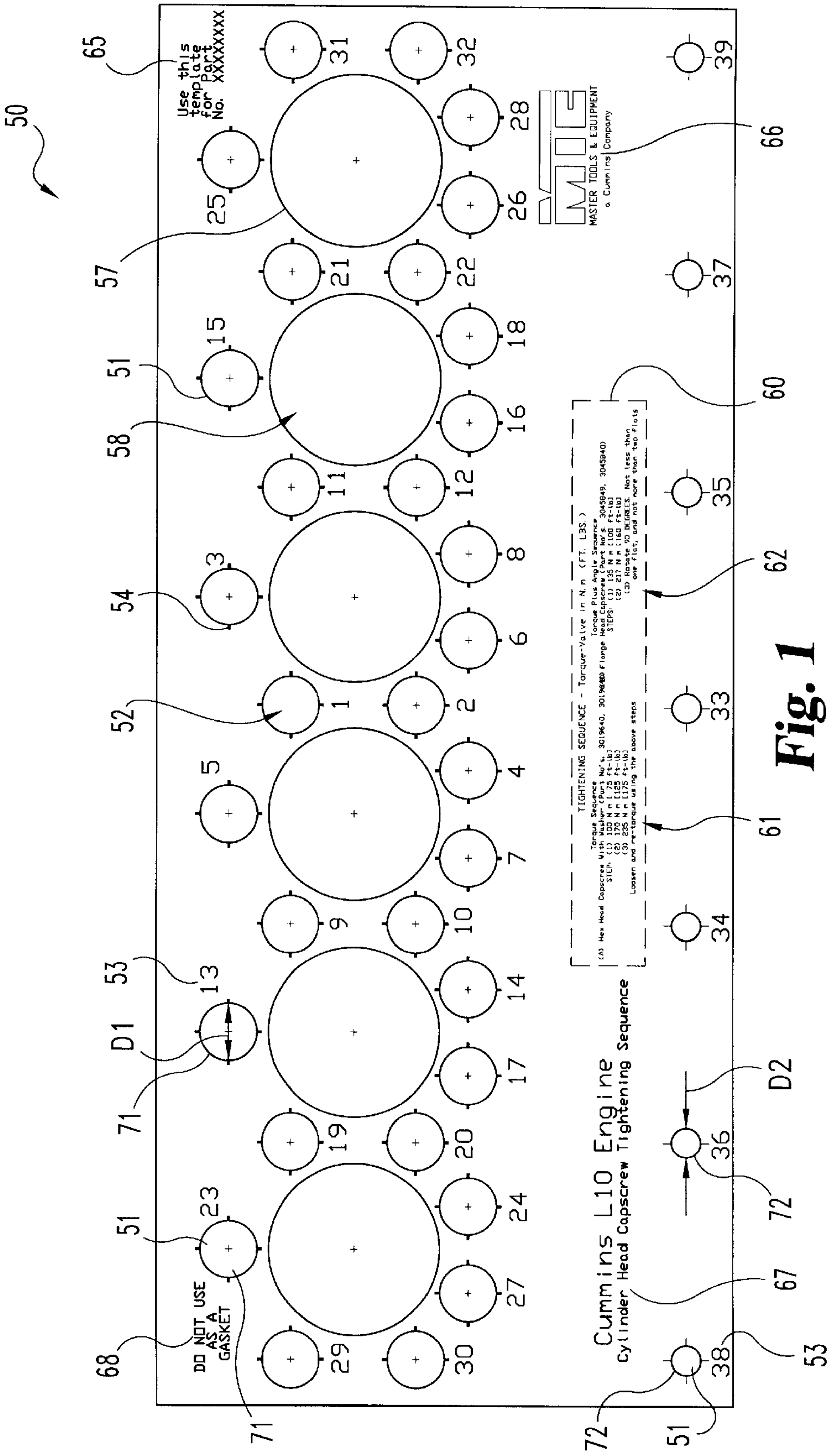
FIG. 1 is a top elevational view of a head gasket template according to one embodiment the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the art that some of the features which are not relevant to the invention may not be shown for the sake of clarity.

A head bolt torque sequence template 50 according to the present invention is illustrated in FIG. 1. The template 50 is formed of a rigid material so as to support a head gasket when packaged with the head gasket. In one form, the template 50 is formed from corrugated cardboard. Corrugated cardboard is relatively inexpensive and provides the sufficient stiffness to support the head gasket and prevent the head gasket from being bent. The head gasket template 50 includes a plurality of bolt punch-outs 51 at positions corresponding to bolt locations on an engine block. The bolt punch-outs 51 are perforated (scored) so that the bolt punch-outs 51 can be "punched out" or detached from the head gasket template 50 to form bolt openings 52. A torque sequence indicator 53 is provided next to each of the bolt punch-outs 51 (bolt openings 52) to indicate the sequence in which the corresponding bolt is tightened. In one form, the torque sequence indicators 53 are printed on the template 50. The torque sequence indicators 53 can be numbers (as shown), letters, and other types of generally known sequence indicators. It should be appreciated that arrows or other directional indicia can be combined with the torque sequence indicator 53 in order to associate a bolt with the proper torque sequence indicator 53. As shown, the torque sequence indicators 53 are located on one side of the template 50. It should be appreciated that the torque sequence indicators 53 can be located on both sides of the template 50.

The template 50 further has angle indicators 54 provided around the bolt openings 52. The angle indicators 54 are used to show how much the bolt is rotated during tightening or loosening. The head gasket template 50 further includes obstruction punch-outs 57. Obstruction punch-out openings 58 are formed when the obstruction punch-outs 57 are punched out from the head gasket template 50. The obstruction punch-out openings 58 allow the template 50 to avoid obstructions, such as valve spring assemblies. Obstructions can pass through the obstruction punch-out openings 58 so that the template 50 can be properly positioned with respect to the bolt locations on the engine. The template 50 further has an instruction section 60 at which torque sequence instructions and torque values are displayed. The instruction section 60 includes a torque sequence instruction section 61 and a torque plus angle sequence instruction section 62.

As shown in FIG. 1, the template 50 includes a part number indicator 65, a supplier identifier 66, an engine type identifier 67, and a warning section 68. The part number indicator 65 indicates the part number for the head gasket for which the template is designed, and the supplier identifier 66 identifies the supplier of the head gasket. The engine type identifier 67 identifies the type(s) of engines that use the head gasket. Any warnings about the head gasket are given in the warning section 68.

As shown in FIG. 1, the bolt openings 52 have a substantially circular shape. It should be appreciated that the bolt openings 52 can have different shapes. In the illustrated embodiment, the head gasket template 50 has two sizes of bolt openings 52, a large size type opening 71 and a small size type opening 72. The large size type opening 71 has a diameter D1 that is larger than diameter D2 of the small diameter type opening 72. In one form, the large type opening 71 has a diameter D1 of approximately 1.56 inches. The bolt openings 52 are sized so that a head bolt can pass through the head bolt opening 52. It should be appreciated that the bolt openings 52 can be sized differently in order to accommodate differently sized bolts. It should be understood that all of the bolt openings 52 also can have a uniform size.

Figure 2:
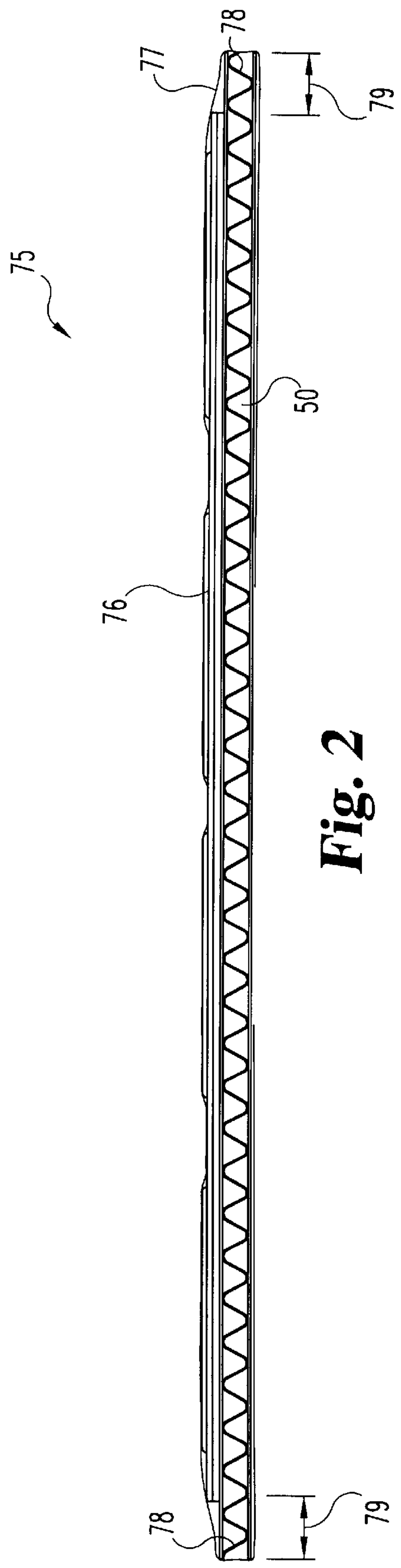
FIG. 2 is a side elevational view of a head gasket packaged with the head gasket template shown in FIG. 1.

The head gasket template 50 according to the present invention is used as a head gasket backing when packaged with a head gasket. An example of such packaging 75 is shown in FIG. 2. In packaging 75, a head gasket 76 is placed on the head gasket template 50. The template 50 is rigid and prevents bending of the head gasket 76. A wrapper 77 wraps around the head gasket 76 and the head gasket template 50 so as to protect the head gasket 76 from environmental contamination. In one form, the wrapper 77 is a clear plastic. It should be appreciated that other types of wrapping material generally known by those skilled in the art can be used to package the head gasket 76. Using the template 50 as a backing for the head gasket 76 makes the template 50 available whenever an engine is rebuilt without wasting material. Further, packaging the template 50 with the head gasket 76 reduces the risk that the head gasket 76 will be improperly compressed due to a mechanic following the wrong torque sequence.

The head gasket template 50 is slightly larger than the head gasket 76 in order to reduce the risk of gasket damage from side impacts. By having the head gasket template 50 at the approximate size of the gasket 76 allows for easy visualization of the torque sequence. The template 50 has an overhang portion 78 that surrounds the gasket 76. This overhang portion 78 prevents the gasket from being bent or damaged from side impacts. If the gasket is bent or damaged, the head gasket 76 may leak when installed. The overhang portion 78 overhangs the head gasket 76 by an overhang distance 79. In one form, this overhang distance 79 is approximately ¼ of an inch. It should be appreciated that the overhang distance 79 can vary depending on the amount of protection desired. Furthermore, it should be understood that the head gasket 76 can be packed with the head gasket template 50 in other manners as generally known to those skilled in the art. For example, packaging 75 can be packed in a box along with other components from an engine rebuild kit. In another example, a plastic film is placed between the head gasket 76 and the head gasket template 50 so that the head gasket 76 is further protected. After the head gasket 76 is installed, the head gasket template 50 can be discarded along with the other packaging material.

Figure 3:
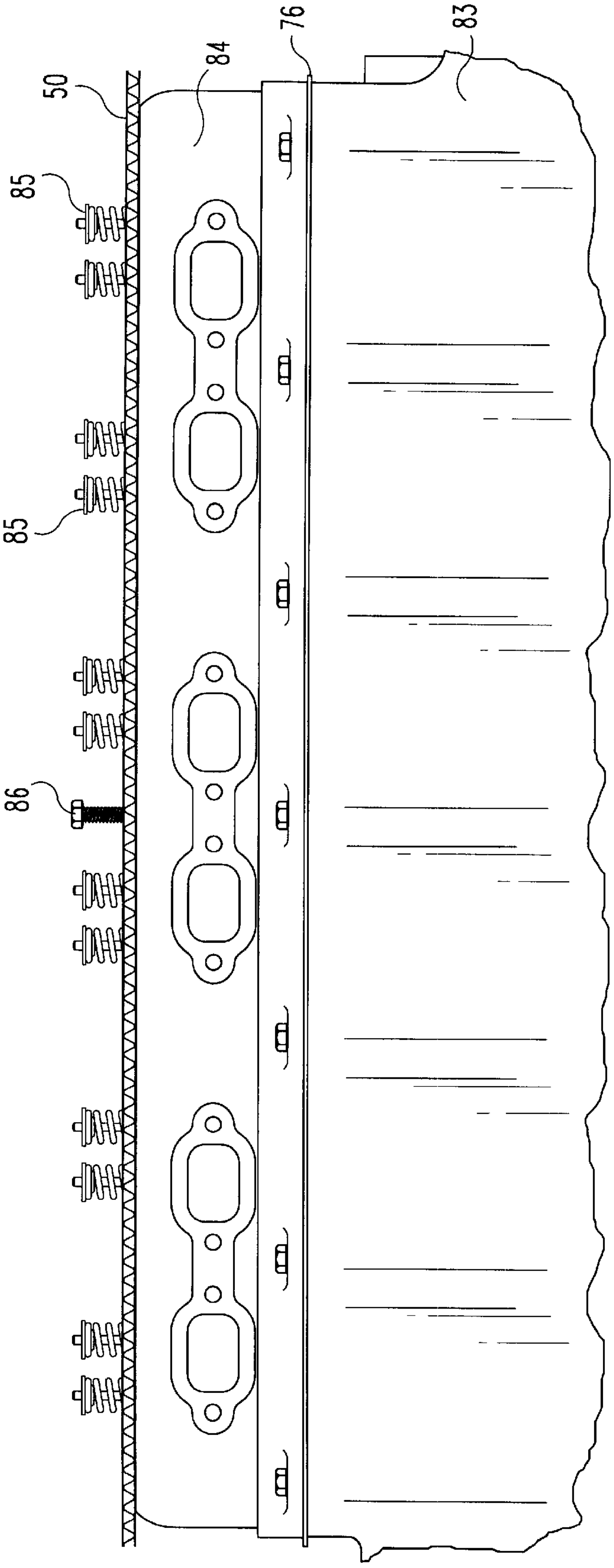
FIG. 3 is a side elevational view of the head gasket template shown in FIG. 1 positioned on an engine.

One technique of tightening head bolts using the template 50 will now be described with reference to FIGS. 3 and 4. In FIG. 3, a head gasket 76 is placed between an engine block 83 and a cylinder head 84. Punch-outs 51 and 57 are punched out to form openings 52 and 58 in the template 50. The head gasket template 50 is then placed on top of head 84, and the valve springs 85 extend through the obstruction openings 58. Bolts 86 are used to secure the head 84 to the engine block 83. It should be appreciated that bolts 86 can include head bolts, stud-nut assemblies, and other generally known types of fasteners that secure cylinder heads to engine blocks.

Figure 4:
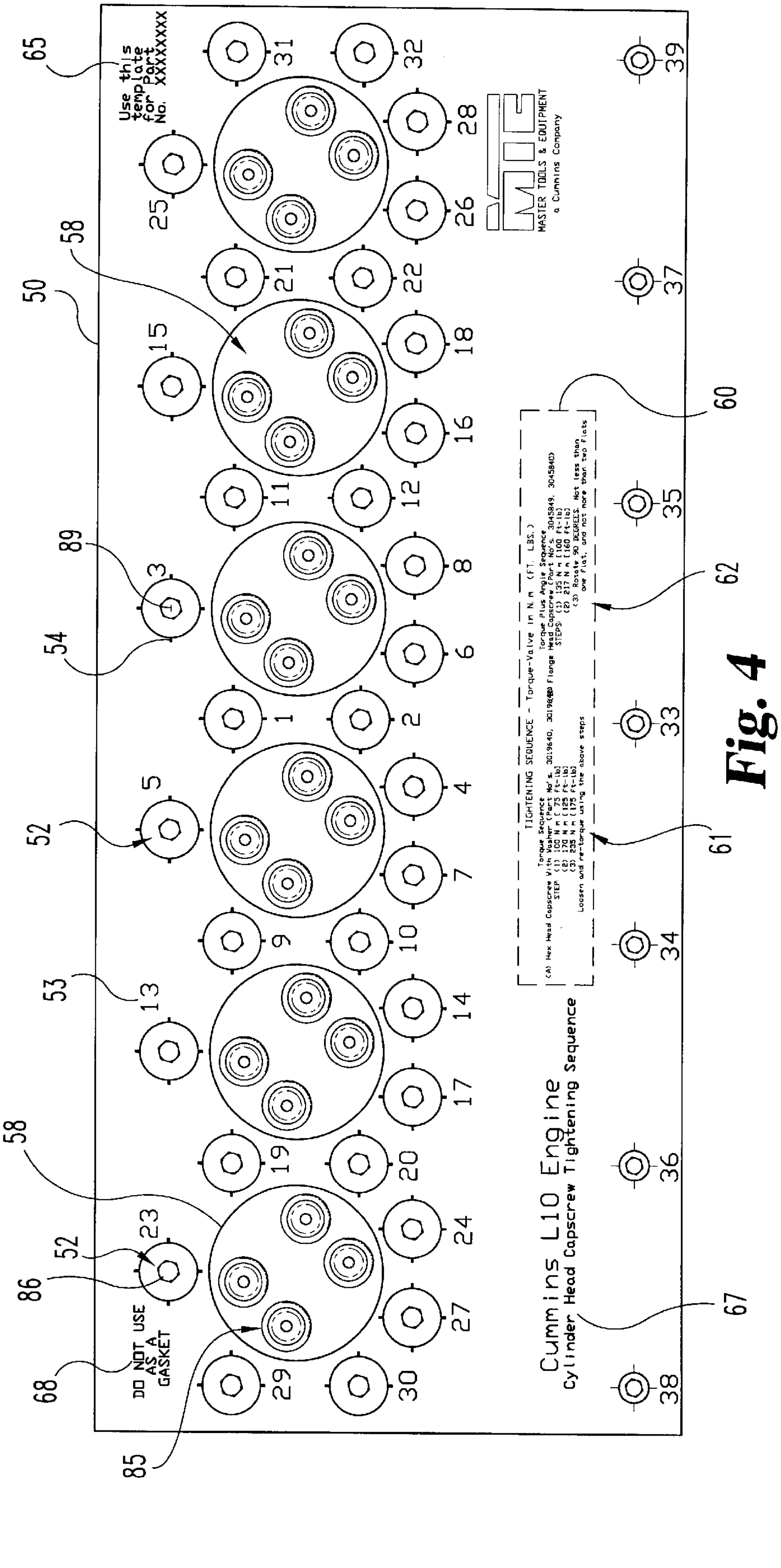
FIG. 4 is a top elevational view of the head gasket template positioned on the engine.

A top view of the template 50 placed on top of the engine head 84 is illustrated in FIG. 4. As shown, the bolt openings 52 are aligned with the locations of bolts 86 on the engine block 83. The valve springs 85 pass through the obstruction pass-through openings 58. In the illustrated form, the bolt openings 52 are sized so that the bolts 86 can pass through the bolt openings 52 when the bolts 86 are fully tightened. A mechanic follows the instructions in the instruction section 60 in order to tighten or loosen the bolts 86.

As mentioned above, the instruction section 60 of the template 50 has two sections of instructions, the torque sequence instruction section 61 and the torque sequence plus angle sequence instruction section 62. The mechanic can follow the instructions in either section 61 or 62. Using the torque sequence instruction section 61, the mechanic tightens the bolt 86 to a specific torque level given in each step and in the sequence shown by the torque sequence indicators 53. The torque sequence instruction section 61 shown in FIG. 4 has been reproduced below in Table 1.

TABLE 1

| Torque Sequence | |
|---|---|
| (1) | 100 N m [75 ft-lb.] |
| (2) | 170 N m [125 ft-lb.] |
| (3) | 235 N m [175 ft-lb.] |

Loosen and re-torque using the above steps

Following the above instructions, the mechanic tightens the first bolt 86, which is indicated by the "1" torque sequence indicator 53, to 100 Nm (75 ft.-lb.). The mechanic then sequentially tightens the bolts 86 in the order indicated by the torque sequence indicators 53 until the last bolt 86 in the sequence ("39") is tightened. After tightening the bolts 86 to the first torque level in step (1), the mechanic then proceeds to sequentially tighten the bolts 86 in the order indicated by the torque sequence indicators 53 to 170 Nm (125 ft.-lb.). Afterwards, the mechanic then proceeds to step (3) and sequentially tightens the bolts 86 to 235 Nm (175 ft-lb).

Alternatively, the mechanic can follow the instructions in the torque plus angle sequence instruction section 62. The torque plus angle sequence instruction section 62 shown in FIG. 4 has been reproduced below in Table 2.

TABLE 2

| Torque Plus Angle Sequence | |
|---|---|
| (1) | 135 N m [100 ft-lb] |
| (2) | 217 N m [160 ft-lb] |
| (3) | Rotate 90 DEGREES. Not less than one flat, and not more than two flats |

A mechanic following the torque plus angle sequence instruction section 62 would sequentially tighten the bolts to the torque levels indicated in steps (1) and (2) in a manner similar to as described above with reference to the torque sequence instruction section 61. In step (3), however, the mechanic rotates the bolts 86 an additional amount, which in this case is ninety-degrees (90°). The mechanic can use the angle indicators 54 in order to determine the amount of rotation of the bolt 86. The mechanic can also place a mark 89 on the bolt 86 in order to determine that the bolt 86 has been rotated the proper amount.

After the bolts have been properly tightened, the head gasket template 50 can be discarded. It should be appreciated that if desired, the head gasket template 50 can be reused. Furthermore, instead of punching out the punch-outs 51 and 57, a mechanic can use the template 50 as a guide when tightening the bolts 86, by placing the template 50 near to the engine for reference. The larger print of the template compared to a shop manual helps reduce errors.

While specific embodiments of the present invention have been shown and described in detail, the breadth and scope of the present invention should not be limited by the above described exemplary embodiments, but should be defined only in accordance with the following claims and their equivalents. All changes and modifications that come within the spirit of the invention are desired to be protected.

What is claimed is:

1. A torque sequence template, comprising:

a head gasket backing constructed and arranged to support a head gasket when packaged with said head gasket, said backing having at least two bolt openings defined therein at positions corresponding to positions of bolts that compress said head gasket between a cylinder head and an engine block;

wherein said backing has a torque sequence indicator provided next to each of said bolt openings for indicating a torque sequence for said bolts; and wherein said bolt openings each have torque angle indicators provided around a periphery of each of said bolt openings for indicating how far said bolts are rotated during tightening.

2. The template of claim 1, wherein:

said backing has torque sequence instructions provided thereon; and said instructions include torque plus angle sequence instructions that indicate how far said bolts should be rotated during tightening.

3. The template of claim 1, wherein said backing includes corrugated cardboard.

4. The template of claim 1, wherein said bolt openings each have bolt punch-outs provided therein.

5. The template of claim 1, wherein said backing has torque sequence instructions provided thereon.

6. The template of claim 1, wherein said backing includes an obstruction opening constructed and arranged to allow an obstruction to pass through said backing.

7. The template of claim 6, herein said backing includes an obstruction punch-out provided in said obstruction opening.

8. The template of claim 1, wherein said backing has a surface area larger than said gasket.

9. The template of claim 1, wherein said backing has an overhang portion constructed and arranged to protect said head gasket when packaged with said backing.

10. The template of claim 1, wherein each said torque sequence indicator is printed on said backing.

11. The template of claim 1, wherein said bolt openings have a cylindrical shape.

12. The template of claim 1, wherein said bolt openings are sized to allow said bolts to pass through said bolt openings.

13. The template of claim 1, wherein said torque sequence indicator includes a number.

14. The template of claim 1, further comprising:

wherein said backing includes corrugated cardboard and has torque sequence instructions provided thereon, and said backing has an overhang portion constructed and arranged to protect said head gasket when packaged with said backing;

wherein said bolt openings each have bolt punch-outs provided therein, said bolt openings are sized to allow said bolts to pass through said bolt openings, and said bolt openings have a cylindrical shape;

wherein said backing includes an obstruction opening constructed and arranged to allow an obstruction to pass through said backing, and said backing includes an obstruction punch-out provided in said obstruction opening; and wherein each said torque sequence indicator is printed on said backing and includes a number.

15. A package, comprising:

a head gasket;

a head gasket backing supporting said head gasket, said backing having at least two bolt openings provided therein at positions corresponding to positions of said bolts when said bolts secure said cylinder head to said engine block, said backing having a torque sequence indicator provided next to each of said bolt openings to indicate a torque sequence of bolts that compress said head gasket between a cylinder head and an engine block; and wherein said bolt openings each have torque angle indicators provided around a periphery of each of said bolt openings for indicating how far said bolts are rotated during tightening.

16. The template of claim 15, wherein:

said backing has torque sequence instructions provided thereon; and said instructions include torque plus angle sequence instructions that indicate how far said bolts should be rotated during tightening.

17. The package of claim 15, further comprising a wrapper wrapped around said head gasket and said backing to protect said head gasket.

* * * * *